Figure 10:
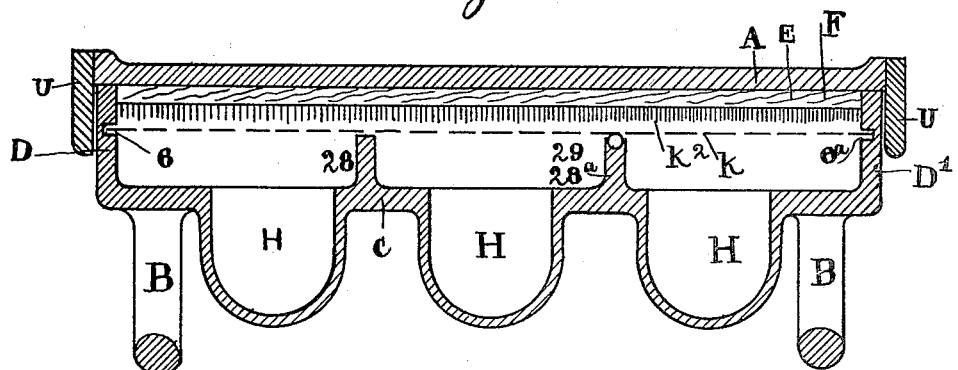

C. R. PASLEY.
MACHINE FOR DELINTING COTTON SEED.
APPLICATION FILED JAN. 4, 1913.
1,131,545.
Patented Mar. 9, 1915.
7 SHEETS—SHEET 1.
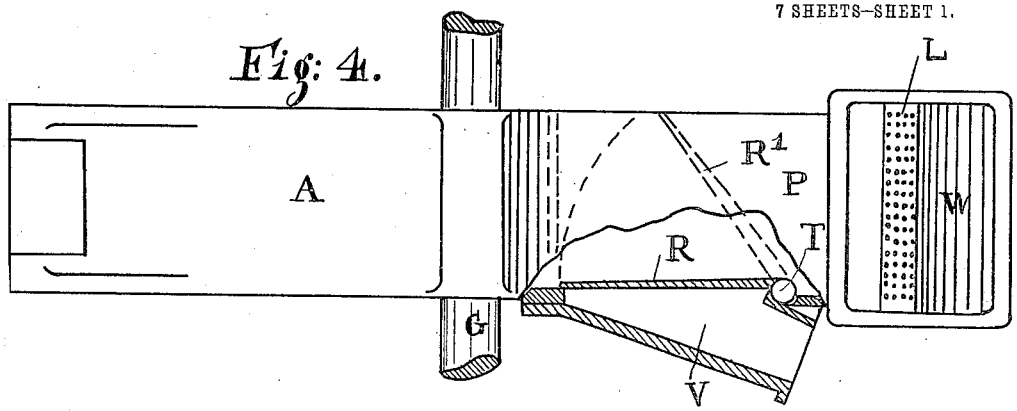
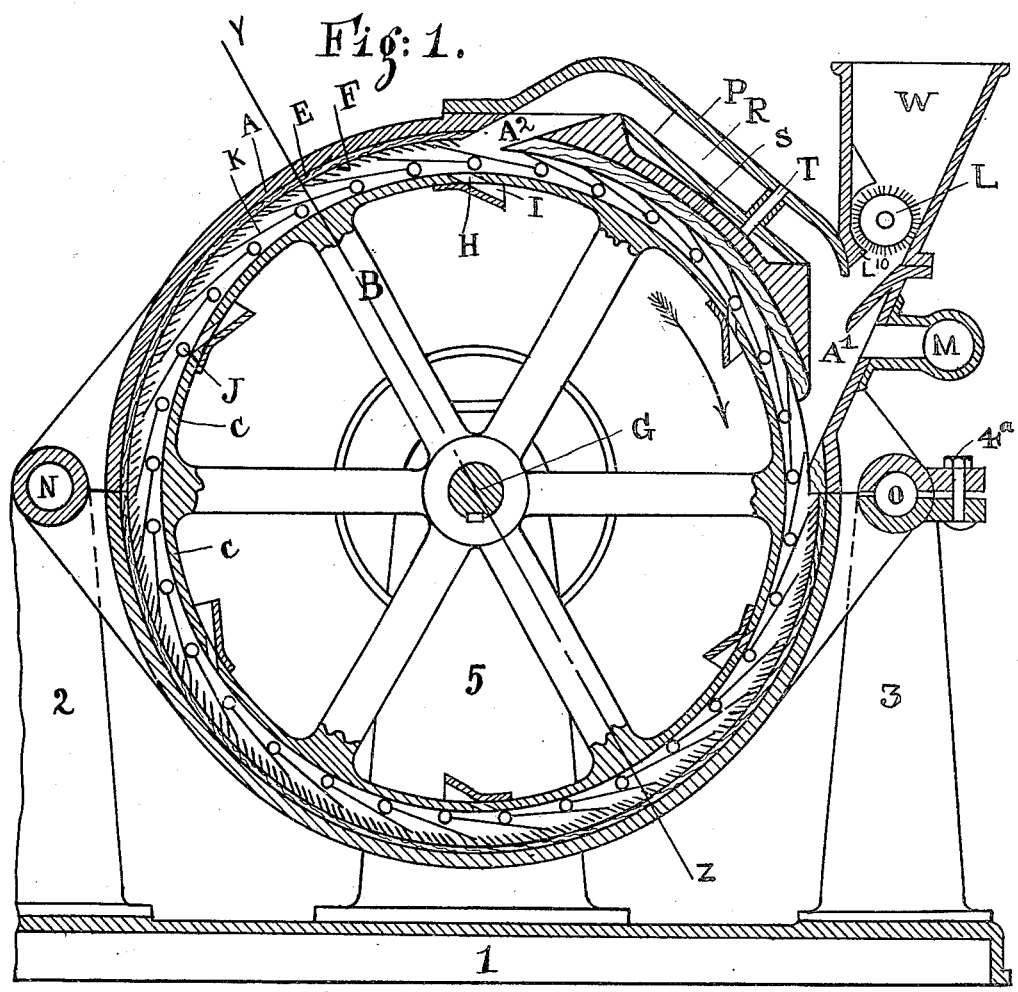
Witnesses
Fenton S Bell
L. E. Witham
Inventor
Charles Reginald Pasley
by
Arthur E. Dowell Attorney

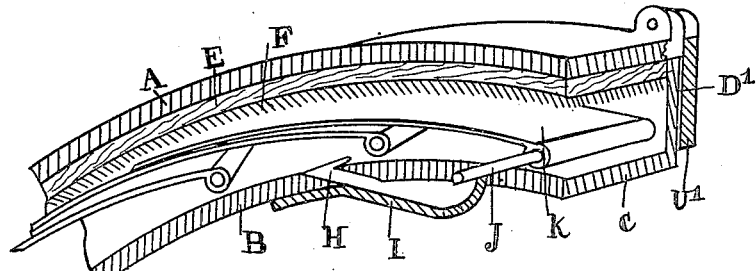
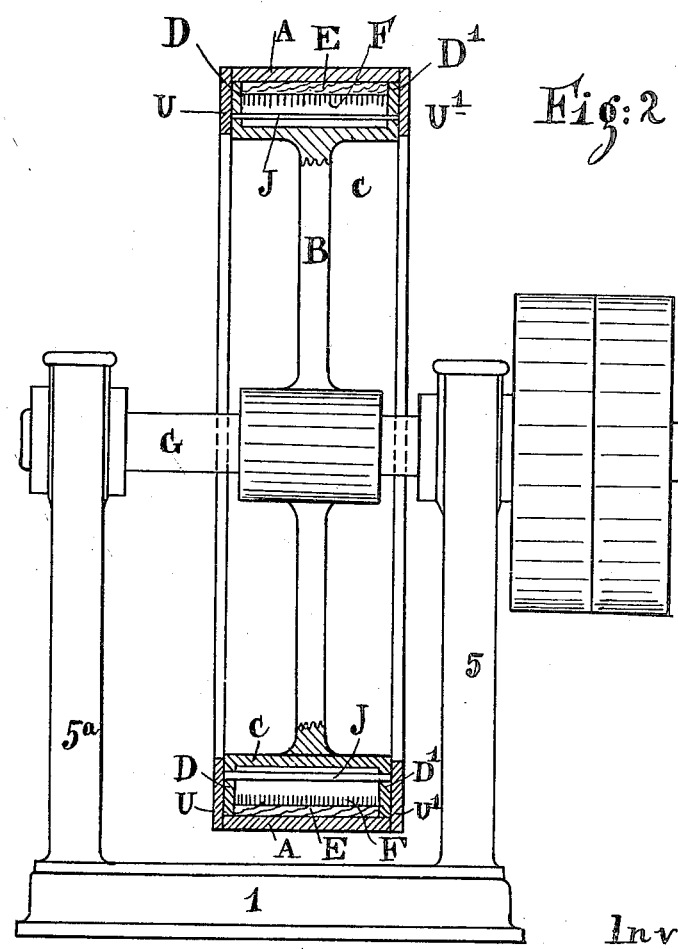

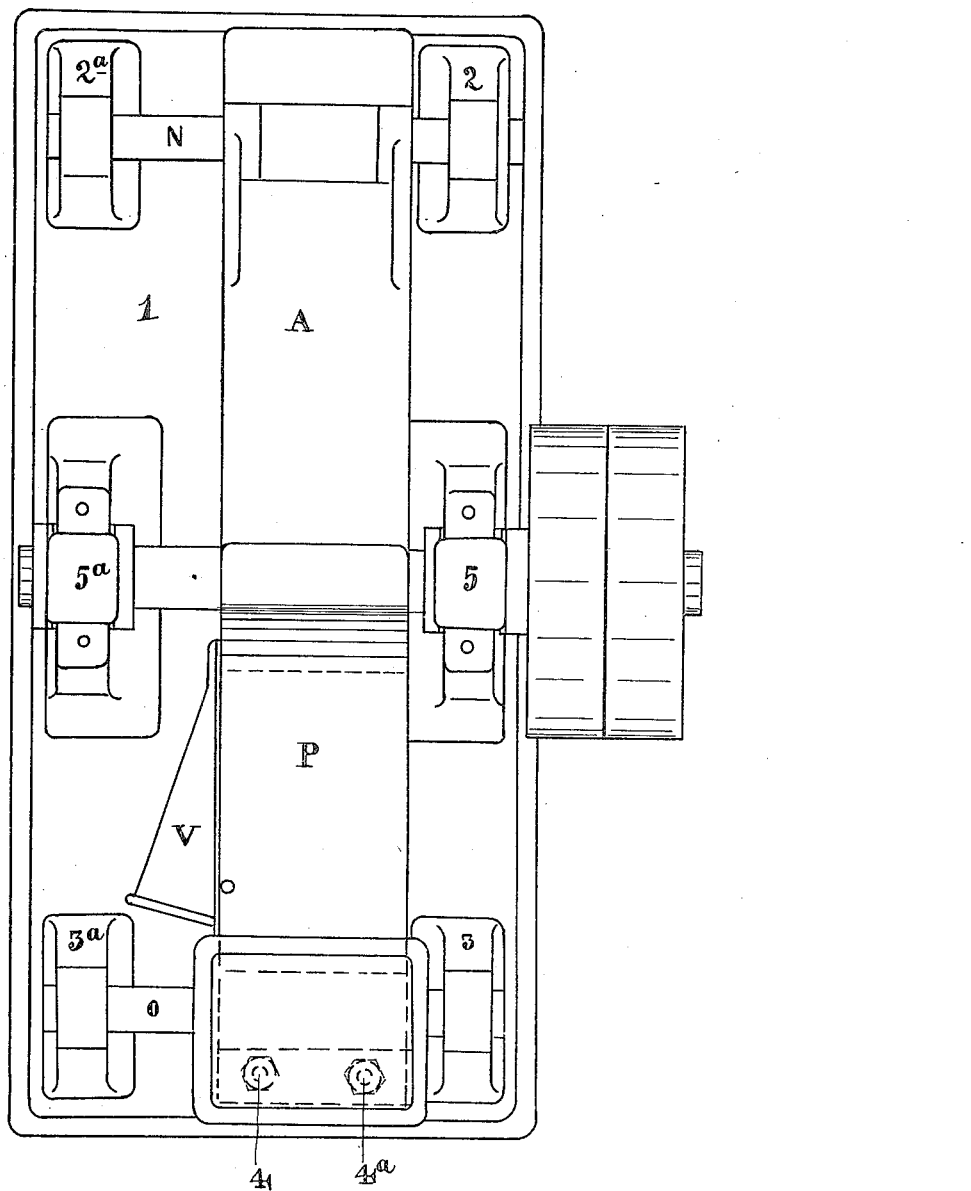

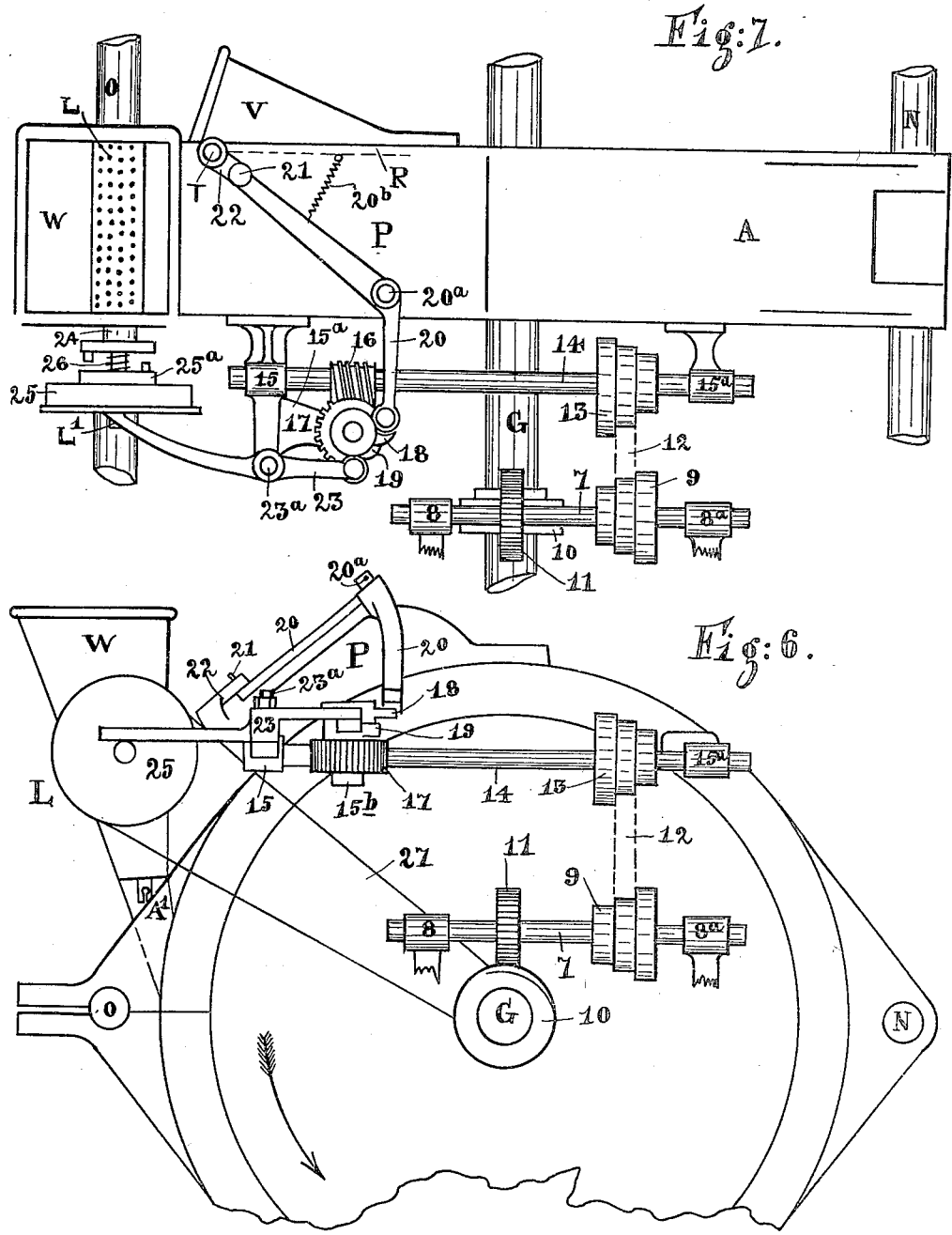

C. R. PASLEY.
MACHINE FOR DELINTING COTTON SEED.
APPLICATION FILED JAN. 4, 1913.
1,131,545.
Patented Mar. 9, 1915.
7 SHEETS—SHEET 5.
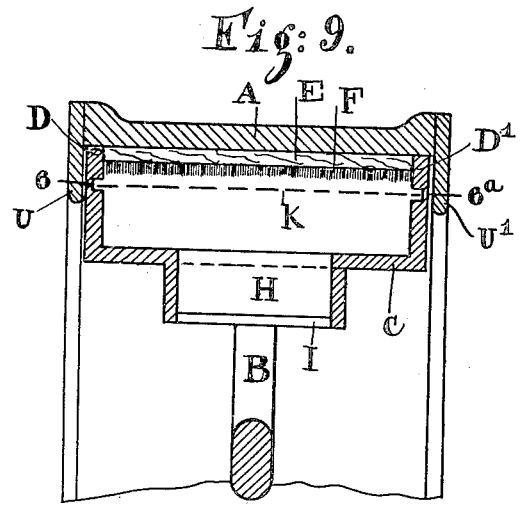
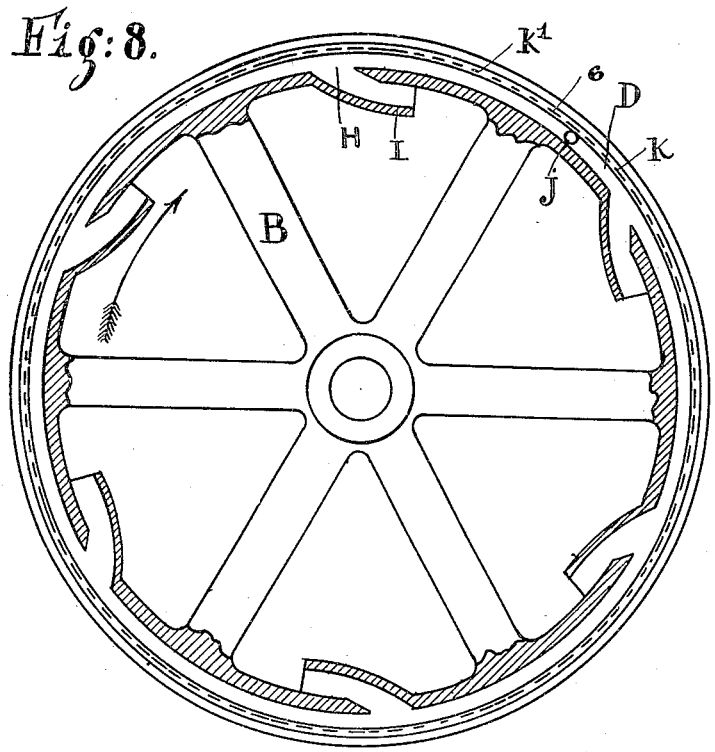
Witnesses
Fenton W Belt
L. E. Witham
Inventor
Charles Reginald Pasley
by Arthur E. Lowell
Attorney C. R. PASLEY.
MACHINE FOR DELINTING COTTON SEED.
APPLICATION FILED JAN. 4, 1913.
1,131,545.
Patented Mar. 9, 1915.
7 SHEETS—SHEET 7.
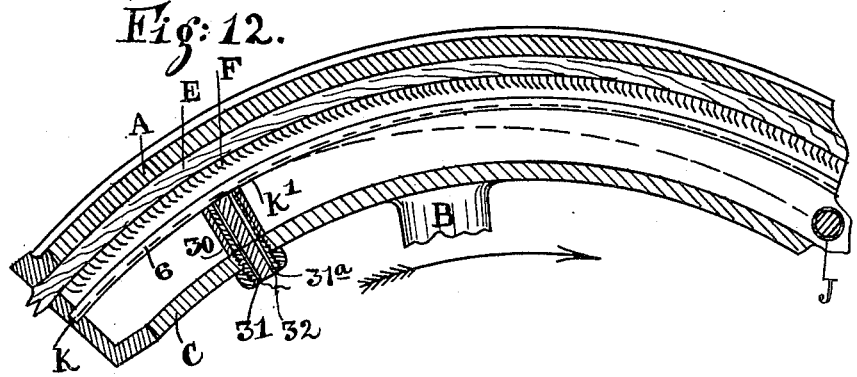
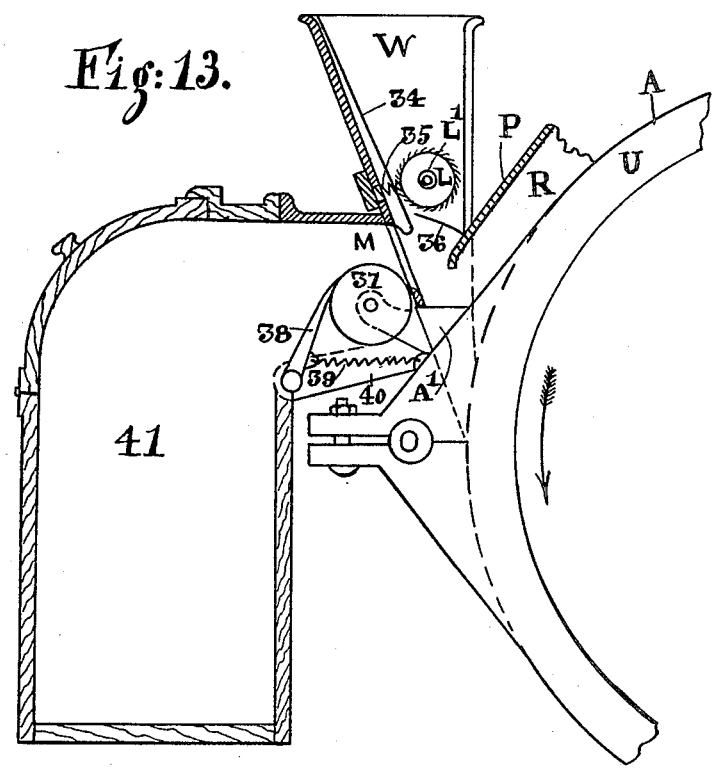
Witnesses
Inventor
Charles Reginald Pasley
by Arthur E. Dowell
Attorney

UNITED STATES PATENT OFFICE.

CHARLES REGINALD PASLEY, OF COLCHESTER, ENGLAND.

MACHINE FOR DELINTING COTTON-SEED.

1,131,545.  Specification of Letters Patent.  Patented Mar. 9, 1915.

Application filed January 4, 1913. Serial No. 740,135.

*To all whom it may concern:*

Be it known that I, CHARLES REGINALD PASLEY, a subject of the King of England, residing at Colchester, in the county of Essex, in England, have invented a certain new and useful Improvement in Machines for Delinting Cotton-Seed, of which the following is a specification.

This invention relates to a machine for removing from cotton seed the surface coating or residue of cotton which the stripping or ginning process leaves adhering to the seed.

In carrying out my invention I construct my machine so that the cotton seed is fed by means of a hopper and entrance port into a cylindrical drum or casing which may be constructed of wood or metal, the interior of which is circular in form and lined with a material which will present a resilient or cushioned surface to the seed, by which it is protected from too drastic treatment. This cylindrical casing has also a discharge port through which the cleaned seed and free cotton are ejected, and in conjunction with the feeding hopper or passage and discharge port, is a connecting tube or passage constructed with an intermediate outlet or opening so placed that by the movements of a movable door or shutter, the seed can be passed back into the casing or deflected and discharged from the machine. Working within the cylindrical casing aforesaid, I employ a revolving wheel or drum, hereinafter called the rotor, which is mounted centrally on an axle. The rotor rim or face can be of any desired width and is preferably constructed with a flange extending perpendicularly outward on each of the outer sides of the rim, thereby forming a wide groove or channel on the periphery of the rotor. Mounted on the face or rim of the rotor and between the two flanges as described I employ one or more rubbers, each so fixed as to allow the rubber to move outward or expand slightly by centrifugal action when the rotor is revolved, but not sufficiently to come in contact with the resilient internal lining of the cylindrical casing. These rubbers are constructed of pliant or flexible material having a surface calculated to exert an abrasive action upon the seed, and by reason of their flexible nature are free, while exerting pressure on the seed, to adjust themselves to seeds of varying form and size with little risk of injury to the seed.

In order to separate the free cotton from the cleaned seed, I perforate the rim of the rotor with a series of holes or slotted openings set at an angle opposed to the direction of rotation of the rotor, thereby utilizing the rotor as a centrifugal air fan or blower.

My invention also comprises means for the mechanical operation of the movable door or shutter situated in the connecting passage at regulated timed intervals; means for the mechanical operation of a rotary feeding device situated in the hopper by which the seed may be fed into the machine at regulated timed intervals; means for mechanically varying the period or time occupied in performing in the machine the complete cycle of operations viz: feeding, cleaning the seed and discharging the delinted seed for regulating the degree to which the cleaning or delinting process is to be carried; means for determining or limiting by mechanical means the position or radius of action of the rubbers mounted on the rotor, means for supporting the rubbers in large rotors in such a manner as to prevent distortion and for securing the free ends of said rubbers by mechanical means of the free cotton discharged from the machine, which might otherwise choke the discharge orifice.

My machine, therefore, consists primarily of a suitably lined casing or drum with feeding and discharge ports, inside which a rotor mounted on a central axle revolves, the said rotor having one or more rubbers attached to its periphery as described, the combination forming a complete unit, only requiring the application of known mechanical means for conveying the uncleaned seed to, and carrying away the cleaned seed from the machine as particular cases may call for.

My machine may consist of one unit as described or as many units may be embodied in one machine as may be required for any given output.

In the accompanying drawings I have illustrated an embodiment which may be used in carrying out my invention.

Of the drawings, Figure 1 is a longitudinal section through the machine. Fig. 2 is a section of the rotor through the line Y—Z. Fig. 3 is a sectional perspective view showing more particularly the details of the drum or casing with its internal resilient lining and the arrangement of the rubbers carried by the rotor in relation thereto, and the air passages in rim of rotor. Fig. 4 is a plan view partly in section showing the position and movements of the deflector.

Figure 11:
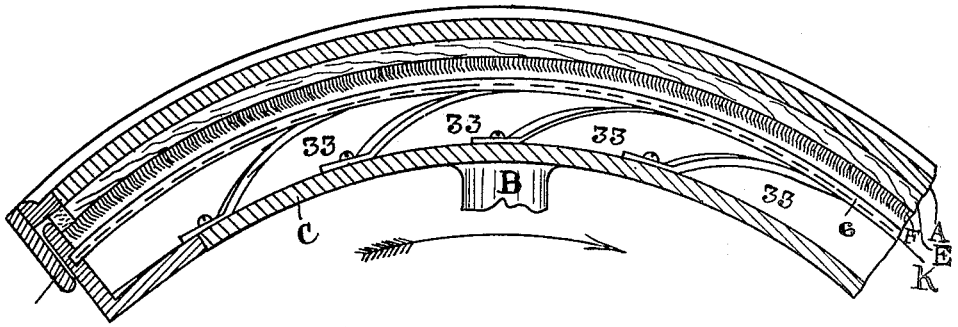

Fig. 5 is a ground plan of the machine. Fig. 6 is a partial side elevation showing attachments employed for actuating the feeding and discharging mechanism. Fig. 7 is a plan view of Fig. 6. Fig. 8 is a partial cross section showing more particularly the flanges of the rotor with grooves therein for securing the rubbers in position. Fig. 9 is a vertical section through the center line of the rotor. Fig. 10 is a section of the rim of the rotor with intermediate concentric rings or flanges thereon for supporting the rubbers. Fig. 11 is a section through the rim of the rotor showing an alternative means of supporting the rubbers. Fig. 12 is a section of the rim of the rotor showing more particularly the means by which the free ends of the rubbers may be secured in position. Fig. 13 is a longitudinal section showing more particularly the feeding and discharge mechanism.

In the drawings A designates the external circular casing or drum which is held in position by the bearing bars N and O which are supported by the base plate 1 and perpendicular standards 2—$2^a$ and 3—$3^a$ respectively. The external casing A may be constructed of timber or cast iron and is preferably divided horizontally into two halves with extensions formed thereon so that at one end they form, in conjunction with the bearing bar N a hinge as shown in Fig. 1; at the other end of each half of casing are also extensions but formed to clip on to bearing bar O, these being secured in position by the bolts 4—$4^a$. This arrangement enables the casing to be easily and quickly opened for inspecting the interior of the machine.

The rotor B which works centrally in casing A, is fixed on the axle G which is carried by the perpendicular standard bearings 5—$5^a$. The axle may be driven by any suitable means for instance a driving belt. In the casing A are formed ports or passages, viz., $A^1$ for the purpose of feeding the cotton seed into the machine, and $A^2$ through which the seed is ejected from the casing A. In order to delint the seed sufficiently it is necessary to pass it several times through the machine, and for this purpose I employ a tube or suitably formed passage P constructed to connect at one end with the discharge port $A^2$ on casing A and open at the other end to connect with the feed port $A^1$ and having in its side or in any suitable position an intermediate opening or port leading into passage V. Inside the junction passage P, I place a movable or hinged door or deflector plate R which is fixed on the spindle T. The spindle T acts as a hinge pin or center which may be actuated to enable the deflector R to be moved, so that when in the position R the passage V is closed and the seed is passed into feed port $A^1$, and when the deflector R is in the position $R^1$ indicated by dotted lines, the seed is deflected and discharged from the machine through the passage V.

Different classes of seed vary in the length or period of time they are subjected to treatment in the machine to remove the coating of cotton or fiber adhering thereto, and the junction passage P in conjunction with the deflector R enables the seed to be passed through the machine as many times as may be necessary and finally discharged through V. The periodicity of the movements of the deflector R can be secured by means hereinafter described.

For the purpose of introducing the seed into feed port $A^1$ a receiver or hopper of any convenient form may be used and in conjunction therewith a feeding device having a rotary or reciprocating movement may be employed such as for instance a revolving roller or drum L on the periphery of which are set a series of pins standing out therefrom and set in rows, to engage the seed, with the stationary wiper $L^{10}$ so situated as to wipe the seed therefrom into the port $A^1$. Leading from the port $A^1$ I provide a passage leading into the tubular outlet M shown in Fig. 1, through which by means of the current of air established by the fan or blower action of the rotor B as described, a large proportion of the freed lint or coating of cotton removed from the seed is discharged into pipe M or any suitable receptacle.

The casing or drum A has on its interior circumference a lining E of wood or other suitable material into or upon which is fixed a second lining F of a resilient or yielding character to protect the seed from pressure likely to injure the husk. The resilient lining F is preferably formed of fine steel wires so set into or attached to the lining E as to take the form of a series or combination of minute springs with the wires set sloping at an angle in conformity with, and not opposed to, the direction of rotation of the rotor B. The arrangement of the linings E and F are shown in Figs. 1 and 2, and more particularly in Fig. 3.

The portion S of casing A lying between the ports $A^1$ and $A^2$ need not be wire lined as previously set forth but may be filled up to complete the circle with hard wood or other suitable material.

The rotor B shown in Figs. 1 and 2 fixed on axle G may be constructed of wood or cast iron and is formed with a wide rim or face C preferably having on its outer edges the two perpendicular flanges D, $D^1$. Through the rim C of rotor B are a series of air holes or slotted openings H set as shown in Figs. 1 and 3 at an angle opposed to the direction of rotation of the rotor B, through which a current of air is forced by the rapid revolution of the rotor B into the space formed by the rim C and flanges D, D¹ of rotor B and the interior of casing A. The action of the air slots H may be increased by means of air collectors or hoods I fixed on the concave or inner face of rim C of rotor B as shown in Figs. 1 and 3.

Figs. 1 and 3 show a series of rubbers K fixed on the periphery or rim C of rotors B. The rubbers K may be of any number but must be singly or collectively of such a length as to present a continuous frictional surface to the seed and may be formed of any suitable abrasive material of a pliant or flexible character, such as stout woven fabric made of cotton or flax or preferably of fine wove wire, so woven or made as to allow the free passage of air through its entire surface.

One end of each of the rubbers K is hinged or attached in any suitable way between the flanges D, D¹ on the rim C of the rotor B so as to present a continuous frictional surface to the seed passing through the machine, without coming in contact with the lining F of casing A. The rubbers K must be set to lie in conformity with the direction of rotation of rotor B and the set of the wire lining F in casing A, each rubber K being preferably fixed in position on rotor B by a pin J as shown in Figs. 2 and 3, J being passed through corresponding holes in flanges D, D¹ and prevented from becoming displaced when working by the guard rings U, U¹ fixed on casing A as shown in Figs. 2 and 3.

In action, the cotton seed being fed into my machine through the hopper W and feed port A¹ is drawn into the machine by the action of the rubbers K and subjected as long as may be necessary to sharp abrasive treatment between the revolving rubbers K and the fixed resilient lining F in casing A, by which the seed is delinted while retaining the husks unbroken, and when the cleaning or delinting process is completed the seed is discharged through the port A² and the passage V.

In the cycle of operations employed consisting of (a) feeding the seed into the machine, (b) delinting the seed and (c) discharging the cleaned seed, it is essential that each operation should come into action automatically and accurately as to time, interval and period occupied in performing each operation. For this purpose as shown in Figs. 6 and 7, I employ a shaft 7 set at right angles to the main shaft G of the machine and supported by two brackets 8, 8ª which may be fixed to any convenient part of the machine frame. The shaft 7 receives motion from the main shaft G through the worm 10 and worm wheel 11. A shaft 14 carried by brackets 15, 15ª attached to the casing A is mounted parallel to the shaft 7 and receives motion by means of the stepped pulleys 9 and 13 and belt 12, the steps on the pulleys, 9, 13 giving a corresponding numebr of different speeds to the shaft 14. Alternatively the different speeds required of shaft 14 may be obtained by means of gear wheels or by the use of a chain and sprocket wheels. Fixed on said shaft 14 is a worm 16, which meshes with a worm wheel 17 rovolubly mounted on an extension 15ᵇ of bracket 15. The worm wheel 17 should be geared to make one revolution in that period which it is intended should be occupied by a complete cycle of operations of the machine above mentioned.

Attached to and carried by the worm wheel 17 are two cams 18 and 19 for the purpose of actuating respectively the rocking levers 20 and 23. The lever 20, working upon a pin 20ª fixed upon the wall of the intermediate passage P, gives motion by means of a pin 21 to a small lever 22 on the pivot T of the shutter R whereby the latter is actuated, the pin 21 engaging a slot 21ª in lever 22 to allow the necessary movement of the latter. Therefore, the shutter R takes its motion through the two levers 20, 22 from the cam 18 once in each revolution of the worm wheel 17. The shutter R should open slowly and close quickly, and the cam 18 is suitably shaped to give in connection with the spring 20ᵇ this action, and to hold the lever 20 as long as is necessary to allow complete discharge of the cleaned seed through the outlet V.

The revolving feed roller or drum L situated in the hopper W and covered on its periphery with card clothing, is carried by the shaft L¹ on the extended end of which is a loose pulley 25 receiving motion from the shaft G through a belt 27 or other convenient means such as a chain and sprocket wheels or a train of gear wheels. The pulley 25 is free to slide upon the shaft L¹ and on its inner side is attached a toothed disk 25ª forming the free or movable member of a dog clutch. The fixed member 24 of said clutch is secured upon the shaft L¹ and the two members when out of action are kept apart by a coil spring 26. The lever 23 pivoted on the pin 23ª is so formed that one end is always in contact with the sliding pulley 25 and the other end to have contact with the cam 19, so that by the operation of said cam by the lever 23 the pulley with the portion of the dog clutch 25ª thereon, is caused to slide on its shaft L¹ and engage the fixed clutch member 24, thereby causing the roller L to revolve and feed the seed into the machine. When the action of the cam 19 on lever 23 is completed, the coil spring 26 puts the clutch out of action and the feeding operation ceases. Therefore one revolution of the worm wheel 17 constitutes a working period or cycle, during which three operations take place viz., feeding of the seed into the machine followed by delinting of the seed, and finally discharge of the cleaned seed, this cycle of operations being automatically repeated while the machine is working.

Referring to Figs. 8 and 9, the abrasive rubbers K mounted on the rotor B are formed preferably of woven steel wire, and are fixed or limited as to position in relation to the resilent or spring formed lining F of the casing A so that they can exert an abrasive action upon the seed passing through the machine, but are prevented from making contact with said lining F. For limiting the position and radius of action of the rubber L as described, I form narrow rectangular channels or grooves 6, 6ª, in or upon the flanges D, D¹ of the rotor B as shown in Figs. 3, 4, 5, 6 and 7. The rubbers K are made wide enough to span the channel formed by the rim C and the flanges D, D¹ and to extend into said grooves 6, 6ª, thereby securing the rubber or rubbers K in position and preventing the seed from passing around or under the edges of the rubbers. The grooves 6, 6ª are only wide enough to allow the rubbers to slide into position freely and to provide in addition a small radius for expansion or contraction of said rubbers, but not sufficient to allow the seed to enter the grooves 6, 6ª.

It is important that the rubbers K should retain throughout their entire surface lying between the grooves 6, 6ª in the flanges D, D¹ the position and form determined by said grooves in order to insure a uniform surface giving throughout an equal abrasive action upon the seed.

The rubbers K by reason of the circular form they take when confined by the grooves 6, 6ª are capable to some extent of resisting the opposing forces exerted by centrifugal action on one hand and the pressure of the seed on the other hand and at the same time retaining sufficient resilience to prevent undue pressure on the seed. For the purpose of preventing the overlapping ends K¹ of the rubbers K shown in Fig. 12 from becoming distorted I employ a stud or studs 30 fixed at intervals across and between the flanges D, D¹ as may be required. Through the studs 30 are formed two small holes 31, 31ª, and to effectually prevent any distortion of the end K¹ of the rubber, a piece of fine wire in the form of a staple is passed through the free end K¹ of the rubber as shown, and through the two holes 31, 31ª and twisted together as indicated at 32 or otherwise secured.

When the rotor B is of such a width between the flanges D, D¹ as to render intermediate support necessary to prevent distortion of the rubbers K by pressure of the seed, I employ one or more concentric rings or flanges 28, 28ª as shown in Fig. 10, placed at intervals around the rim C between the flanges D, D¹ and so spaced as to give additional support to the rubbers K.

When necessary to obtain maximum resiliency at the points where the rubbers K have contact with the concentric supporting rings 28, 28ª, I employ india rubber rings or bands 29 encircling the flanges 28, 28ª, thereby forming an elastic compressible cushion to support the rubbers. Alternatively, to provide intermediate support to the rubbers when necessary, I employ a series of suitably formed springs as shown at 33, Fig. 11, fixed upon the rim C of the rotor between the flanges D, D¹ instead of the concentric rings or flanges 28, 28ª previously described. To check any outward movement of the rubbers K when wide rimmed rotors are employed, I lace them with fine wire, or otherwise secure them to the flanges 28, 28ª or to the springs 33.

Fig. 13 shows the general arrangement of the hopper W with the feeding roller L situated therein, 34 being a guide plate corresponding in width to the interior of the hopper W and kept in contact with the feed roller L, coil springs 35 being provided to allow the plate 34 to adjust itself to the size of the seed, thereby avoiding crushing or injury to the husk of the seed, and 36 is a wiper plate, to clear the feeding roller L of seed which might adhere to it.

A¹ is the inlet or feeding port in casing A through which the seed passes into the machine.

P is the passage connecting the discharge port A² and the inlet port through which, during the delinting period, the seed and free cotton pass, the freed cotton being by means of the air blast established in the machine, discharged through the orifice M into any suitable receiver such as 41. The greater part of the freed cotton is discharged freely into said receptacle, but to prevent the orifice M becoming choked by freed cotton which might collect on the lower part thereof I employ a drum or roller 37 which may be of wood or metal, supported by brackets 40 which roller is caused to revolve by any suitable means such as a belt, in connection with which is the hinged wiper 38 held in position by the spring 39 which wipes off the freed cotton adhering to the roller 37 and discharges it into the receiver 41.

As an alternative to the construction in which I employ a timed cycle of working, operated at intervals in one machine as described, I construct a multiple or compound machine consisting of a number of consecutive units or machines arranged so that each unit discharges into the adjoining or next following unit, so that the delinting of the seed, in passing through a multiple of units, is completed. When this arrangement of consecutive units is employed it is unnecessary to employ a feeding hopper on each unit F.

In the accompanying drawings where necessary, I indicate by means of arrows the direction of rotation of the rotor B as drawn in each figure.

What I claim as my invention and desire to secure by Letters Patent of the United States is:

1. In a machine for delinting cotton seed the combination of an external casing having feed and discharge means for the seed, a revolving wheel or rotor within said casing, a resilient inner lining for said casing formed of a plurality of fine metallic elements disposed at an angle conforming to the direction of rotation of the rotor, abrasive rubbing means mounted on said rotor on the face exposed to the lining, and means for preventing contact of said rubbing means with said lining.

2. In a machine for delinting cotton seed the combination of an external casing, a revolving wheel or rotor within said casing, and a flange extending perpendicularly outward from each of the outer edges of the rim of said rotor, the latter being provided with air passages or slots so formed in the rim thereof as to give said rotor the character of a centrifugal air collector or pressure fan.

3. In a machine for delinting cotton seed the combination of an external casing having feed and discharge ports, a revolving wheel or rotor within said casing, a connecting conduit intermediate said ports and a movable door or deflector located in said conduit whereby seed ejected from the discharge port can be either passed through said conduit back into the casing for further treatment or discharged from said casing when the treatment is completed.

4. In a machine for delinting cotton seed the combination of an external casing having feed and discharge means for the seed, a revolving wheel or rotor within said casing, a resilient inner lining for said casing formed by a plurality of fine metallic elements disposed at an angle conforming to the direction of rotation of the rotor, a rubbing element on said rotor coöperating with said lining to delint the cotton seed, and a flange extending perpendicularly outward from each outer edge of the periphery of the rotor to form a channel in which said rubbing element is disposed.

5. In a machine for delinting cotton seed the combination of an external casing having feed and discharge means for the seed, a revolving wheel or rotor within said casing, a resilient inner lining for said casing formed by a plurality of fine metallic elements disposed at an angle conforming to the direction of rotation of the rotor, a rubbing element on said rotor coöperating with said lining to delint the cotton seed, a flange extending perpendicularly outward from each outer edge of the periphery of the rotor to form a channel in which said rubbing element is disposed, the periphery of said rotor being provided with air passages disposed at an angle opposed to the direction of rotation of the rotor.

6. In a machine for delinting cotton seed the combination of an external casing having feed and discharge means for the seed, a revolving wheel or rotor within said casing, a resilient inner lining for said casing formed by a plurality of fine metallic elements disposed at an angle conforming to the direction of rotation of the rotor, a connecting conduit between the inlet and discharge means and a movable door or deflector located in said conduit.

7. In a machine for delinting cotton seed the combination of an external casing having feed and discharge means for the seed, a revolving wheel or rotor within said casing, a resilient inner lining for said casing formed by a plurality of fine metallic elements disposed at an angle conforming to the direction of rotation of the rotor, a flange extending perpendicularly outward from each lateral edge of the periphery of the rotor to form a channel for passage of seed, means for supply of air to said channel in a direction opposed to the direction of rotation of the rotor, a connecting conduit between the inlet and discharge means, and a movable deflector located in said conduit.

8. In a machine for delinting cotton seed the combination of an external casing having feed and discharge means for the seed, a revolving wheel or rotor within said casing, a resilient inner lining for said casing formed by a plurality of fine metallic elements disposed at an angle conforming to the direction of rotation of the rotor, a connecting conduit between the inlet and discharge means, a movable door or deflector located in said conduit, and means for automatically and intermittently operating said door or deflector at predetermined intervals.

9. In a machine for delinting cotton seed the combination of an external casing having inlet and discharge ports for the seed, a revoluble wheel or rotor within said casing, a feed hopper in communication with said inlet port, a rotary feeding device within said hopper, means for automatically and intermittently operating said feeding device at predetermined intervals, a door or deflector for controlling passage through said discharge port, and means for automatically operating said door or deflector at predetermined intervals.

10. In a machine for delinting cotton seed the combination of an external casing, devices for the feeding of seed to and discharge of seed from said casing, a rotor within said casing and spaced from the internal circumference thereof to afford a channel in which the seed is delinted, a resilient inner lining for said casing formed by a plurality of fine metallic elements disposed at an angle conforming to the direction of rotation of the rotor, an abrasive rubber mounted on said rotor and coöperating with the aforesaid casing to delint the seed, means for effecting a timed cycle of actuation of the feeding, delinting and discharging operations, and mechanical means for producing a variable cycle period whereby the degree of delinting may be regulated.

11. In a machine for delinting cotton seed, the combination of an outer casing lined on its internal circumference, a rotor within said casing, perpendicular peripheral flanges on said rotor and abrasive rubbers mounted on said rotor between the flanges thereof, said flanges having concentric grooves or channels adapted to limit the position of said rubbers and prevent contact thereof with the inner lining of the casing.

12. In a machine for delinting cotton seed, the combination of a rotor, perpendicular peripheral flanges on the outer edges of said rotor, abrasive rubbers mounted on the rotor between said flanges, means for securing or limiting the movements of the free ends of said rubbers and means for preventing distortion of the portions of said rubbers located between the flanges.

13. In a machine for delinting cotton seed the combination of a rotor, peripheral flanges on said rotor forming a channel and having grooves therein and rubbers mounted on the rotor within said channel, the said rubbers engaging said grooves to secure or limit their position and radius of action.

14. In a machine for delinting cotton seed the combination of an external casing having feed and discharge means for the seed, a revolving wheel or rotor within said casing, a resilient inner lining for said casing formed by a plurality of fine metallic elements disposed at an angle conforming to the direction of rotation of the rotor, a flange extending perpendicularly outward from each outer edge of the periphery of the rotor, abrasive rubbers mounted on said rotor between said flanges, and means for preventing contact of said rubbers with the resilient lining of the casing.

15. In a machine for delinting cotton seed the combination of an external casing having feed and discharge means for the seed, a revolving wheel or rotor within said casing, a resilient inner lining for said casing formed by a plurality of fine metallic elements disposed at an angle conforming to the direction of rotation of the rotor, a flange extending perpendicularly outward from each outer edge of the periphery of the rotor, abrasive rubbers mounted on said rotor between said flanges, means for preventing contact of said rubbers with the resilient lining of the casing, a connecting conduit between the inlet and discharge means, a movable door or deflector located in said conduit, and means for automatically and intermittently operating said door at predetermined intervals.

16. In a machine for delinting cotton seed the combination of an exterior casing having feed and discharge ports for the seed, a revolving wheel or rotor within said casing, a resilient inner lining for said casing formed by a plurality of fine metallic elements disposed at an angle conforming to the direction of rotation of the rotor, a rotary device adapted to feed seed to said inlet port, means for automatically operating said feeding device at predetermined intervals, a door or shutter for controlling said discharge port, means for automatically operating said door or shutter at predetermined intervals, abrasive rubbers mounted on the periphery of the rotor, and means for preventing contact of said rubbers with the lining of the casing.

17. In a machine for delinting cotton seed the combination of an exterior casing having feed and discharge ports for the seed, a revolving wheel or rotor within said casing, a resilient inner lining for said casing formed by a plurality of fine metallic elements disposed at an angle conforming to the direction of rotation of the rotor, a rotary device adapted to feed seed to said inlet port, means for automatically operating said feeding device at predetermined intervals, a door or shutter for controlling said discharge port, means for automatically operating said door or shutter at predetermined intervals, peripheral flanges on the rotor forming a channel for passage of seed between the rotor and casing lining, means of admission of air to said channel in a direction opposed to the direction of rotation of said rotor, abrasive rubbers mounted on the periphery of the rotor between the flanges aforesaid, and means for securing or limiting the radius of action of said rubbers.

In witness whereof I have signed this specification in the presence of two witnesses.

CHARLES REGINALD PASLEY.

Witnesses:
S. FORD,
WM. H. PASLEY.